US011260952B2

(12) United States Patent
Vasel (10) Patent No.: US 11,260,952 B2
(45) Date of Patent: Mar. 1, 2022

(54) REINFORCED SUPERPLASTIC FORMED AND DIFFUSION BONDED STRUCTURES

(71) Applicant: The Boeing Company, Chicago, IL (US)

(72) Inventor: Corey Vasel, Arnold, MO (US)

(73) Assignee: The Boeing Company, Chicago, IL (US)

( * ) Notice: Subject to any disclaimer, the term of this patent is extended or adjusted under 35 U.S.C. 154(b) by 14 days.

(21) Appl. No.: 16/584,377

(22) Filed: Sep. 26, 2019

(65) Prior Publication Data

US 2021/0094670 A1 Apr. 1, 2021

(51) Int. Cl.
*B23K 20/00* (2006.01)
*B64C 1/38* (2006.01)
(Continued)

(52) U.S. Cl.
CPC .............. *B64C 1/38* (2013.01); *B21D 39/031* (2013.01); *B23K 11/0093* (2013.01);
(Continued)

(58) Field of Classification Search
CPC .. B23K 33/004; B23K 11/0093; B23K 20/02; B23K 33/00; B23K 2103/42;
(Continued)

(56) References Cited

U.S. PATENT DOCUMENTS 3,924,793 A * 12/1975 Summers ............... B23K 20/00
228/157
3,927,817 A * 12/1975 Hamilton ............... B23K 20/18
228/157

(Continued)

FOREIGN PATENT DOCUMENTS

EP 0475882 A1 3/1992
EP 1013355 A2 * 6/2000
(Continued)

OTHER PUBLICATIONS

Search Report for related European Application No. 20193224.1; dated Feb. 24, 2021.

*Primary Examiner* — Kiley S Stoner
(74) *Attorney, Agent, or Firm* — Quinn IP Law (57) ABSTRACT

An exterior panel is formed of superplastic materials, including an exterior skin of titanium to accommodate high thermal stresses imposed on hypersonic transport vehicles during hypersonic flight. The exterior skin is fixed to an underlying reinforcing skeletal structure consisting of a superplastic formable reinforcement (SFR) layer, for example a titanium, zirconium, and molybdenum (TZM) alloy, which supports the exterior skin whenever the latter may be heated to temperatures exceeding 1200 degrees Fahrenheit. The exterior panel includes a separate interior skin configured for attachment to a frame member such as a rib, stringer, or spar of the hypersonic transport vehicle. A multicellular core is sandwiched between the exterior and interior skins to impart tensile and compressive strength to the exterior panel. In one disclosed method, the core is superplastic formed and diffusion bonded to the exterior and interior skins.

20 Claims, 5 Drawing Sheets

(51) Int. Cl.
*B21D 39/03* (2006.01)
*B23K 11/00* (2006.01)
*B23K 20/02* (2006.01)
*B23K 33/00* (2006.01)
*B28B 3/00* (2006.01)
*B29C 65/00* (2006.01)
*B29C 65/64* (2006.01)
*C22C 14/00* (2006.01)
*C22C 19/03* (2006.01)
*C22C 30/00* (2006.01)
*B23K 103/00* (2006.01)
*B23K 11/10* (2006.01)
*B29C 43/10* (2006.01)
*B29C 43/32* (2006.01)

(52) U.S. Cl.
CPC .............. *B23K 20/02* (2013.01); *B23K 33/00* (2013.01); *B28B 3/00* (2013.01); *B29C 65/00* (2013.01); *B29C 65/006* (2013.01); *B29C 65/64* (2013.01); *B29C 66/72525* (2013.01); *C22C 14/00* (2013.01); *C22C 19/03* (2013.01); *C22C 30/00* (2013.01); *B23K 11/10* (2013.01); *B23K 33/004* (2013.01); *B23K 2103/42* (2018.08); *B29C 43/10* (2013.01); *B29C 2043/3222* (2013.01); *B29C 2043/3233* (2013.01)

(58) Field of Classification Search
CPC .............. B23K 11/10; B23K 2101/02; B23K 2101/045; B29C 43/10; B29C 2043/3222; B29C 2043/3233; B29C 65/00; B29C 65/006; B29C 65/64; B29C 66/72525; B21D 26/055; B21D 53/92; B21D 47/00; B21D 39/031; B64G 1/58; B64F 5/10; B64C 3/20; B64C 1/38; C22C 14/00; C22C 19/03; C22C 30/00; B28B 3/00
USPC ................. 228/175–176, 193–195, 155, 157
See application file for complete search history.

(56) References Cited

U.S. PATENT DOCUMENTS

| | | | | |
|---|---|---|---|---|
| 4,217,397 A * | 8/1980 | Hayase | ............... | B23K 11/0093 228/157 |
| 4,292,375 A * | 9/1981 | Ko | ............... | B21D 26/055 428/593 |
| 4,304,821 A * | 12/1981 | Hayase | ................ | B21D 26/055 156/79 |
| 5,330,092 A | 7/1994 | Gregg | | |
| 5,420,400 A * | 5/1995 | Matsen | ................... | B29C 33/06 219/615 |
| 5,687,900 A * | 11/1997 | Zaccone | .............. | B21D 26/055 228/173.6 |
| 5,723,225 A * | 3/1998 | Yasui | ........................ | B32B 3/12 228/157 |
| 5,870,304 A * | 2/1999 | Yasui | ................... | B21D 26/055 700/146 |
| 5,881,459 A * | 3/1999 | Yasui | ................... | B21D 26/055 29/897.32 |
| 5,904,992 A * | 5/1999 | Yasui | ................... | B23K 20/023 428/593 |
| 5,955,207 A * | 9/1999 | Lederich | ............... | B64C 1/12 428/660 |
| 5,994,666 A | 11/1999 | Buldhaupt et al. | | |
| 6,087,640 A * | 7/2000 | Gillespie | .............. | B21D 26/055 219/615 |
| 6,129,261 A * | 10/2000 | Sanders | ................ | B23K 20/02 228/157 |
| 6,337,471 B1 * | 1/2002 | Kistner | ................ | B21D 26/055 219/633 |
| 2005/0133567 A1 * | 6/2005 | Runyan | ............... | B21D 26/055 228/112.1 |
| 2009/0008428 A1 * | 1/2009 | Kaibyshev | .............. | B23P 15/04 228/103 |
| 2017/0050229 A1 * | 2/2017 | Matsen | ................... | B21D 37/16 |
| 2017/0241577 A1 * | 8/2017 | Schell | ..................... | B23K 20/02 |
| 2018/0244016 A1 * | 8/2018 | Matsen | ....................... | B32B 3/28 |
| 2021/0094671 A1 * | 4/2021 | Vasel | ....................... | B32B 3/26 |

FOREIGN PATENT DOCUMENTS

| | | | | |
|---|---|---|---|---|
| EP | 3056292 A1 | | 8/2016 | |
| EP | 3446805 A1 * | | 2/2019 | .......... B21D 26/059 |
| JP | 2002018532 A * | | 1/2002 | .......... B23K 20/023 |
| WO | WO-9727045 A2 * | | 7/1997 | ............ B23K 26/28 |

\* cited by examiner

REINFORCED SUPERPLASTIC FORMED AND DIFFUSION BONDED STRUCTURES

FIELD

The present disclosure relates to superplastic formed and diffusion bonded (SPF/DB) sandwich structures for aerospace applications.

BACKGROUND

Thermal loads imposed on exterior surfaces of high speed aerospace transport vehicles present significant and continuing demands for improved thermal management strategies.

Exterior structures formed of titanium alloys are known to be effective for accommodating high heat flux environments at supersonic speeds. For hypersonic speeds, however, additional heat compensating mechanisms are sought. Ceramic tiles have been used on spacecraft, particularly for managing thermal loads upon atmospheric reentry from space. Nickel alloys have also been utilized in some structures. However, traditional uses of the latter have proven to be heavier and more expensive in terms of their respective structural builds and fuel demands. Previous thermal protections for hypersonic vehicles have not been re-usable, limiting their usefulness in commercial applications.

Thus, less costly structures that may effectively accommodate temperatures at hypersonic speeds are desired.

SUMMARY

In accordance with one aspect of the present disclosure, an exterior panel for a transport vehicle includes an exterior skin configured for atmospheric exposure, and an interior skin configured for attachment to a structural frame member of the transport vehicle. A multicellular core is sandwiched between the exterior and interior skins, and a superplastic formed reinforcement (SFR) layer underlies and supports the exterior skin. The multicellular core is superplastic formed and diffusion bonded to the exterior and interior skins.

In accordance with another aspect of the present disclosure, a transport vehicle includes at least one exterior panel having an exterior skin configured for atmospheric exposure. The exterior panel includes an interior skin configured for attachment to a structural frame member of the transport vehicle. A multicellular core is sandwiched between the exterior skin and the interior skin to impart tensile and compressive strength to the exterior panel, and an SFR layer underlies the exterior skin. The multicellular core is superplastic formed and diffusion bonded to the exterior and interior skins.

In accordance with yet another aspect of the present disclosure, a method of manufacturing an exterior panel for a transport vehicle includes providing an exterior skin of a superplastic material configured for atmospheric exposure, and providing an SFR layer to underlie and support the exterior skin. The method further includes providing an interior skin of a superplastic material configured for attachment to a structural frame member of the transport vehicle and at least a pair of sheet layers of a superplastic material for forming a multicellular core between the exterior skin and the interior skin. Next the sheet layers are bonded together via intermittent seam welds arrayed in a predetermined pattern. An expansion pipe is secured to one edge of the layers, and a continuous fusion weld is applied about the edges of the sheet layers. The exterior and interior skins are then installed with the sheet layers into a pressure containment device, and an inert gas is supplied into the expansion pipe to superplastic form and diffusion bond (SPF/DB) the skins and layers to create a multicellular core that is integrally bonded to the exterior and interior skins. In the completed SPF/DB structure, the SFR layer underlies and reinforces the exterior skin.

The features, functions, and advantages disclosed herein can be achieved in examples presented herein, or may be provided in yet other variations, the details of which may be better appreciated with reference to the following description and drawings.

The referenced drawings are not necessarily to scale, and any disclosed examples are illustrated only schematically. Aspects of disclosed examples may be combined with or substituted for one another, and within various systems and environments that are neither shown nor described herein. As such, the following detailed description is merely exemplary, and not intended to be limiting in either application or use.

DETAILED DESCRIPTION

The following detailed description includes apparatus and methods for carrying out the present disclosure. Actual scope of the disclosure is as defined in the appended claims.

Figure 1:
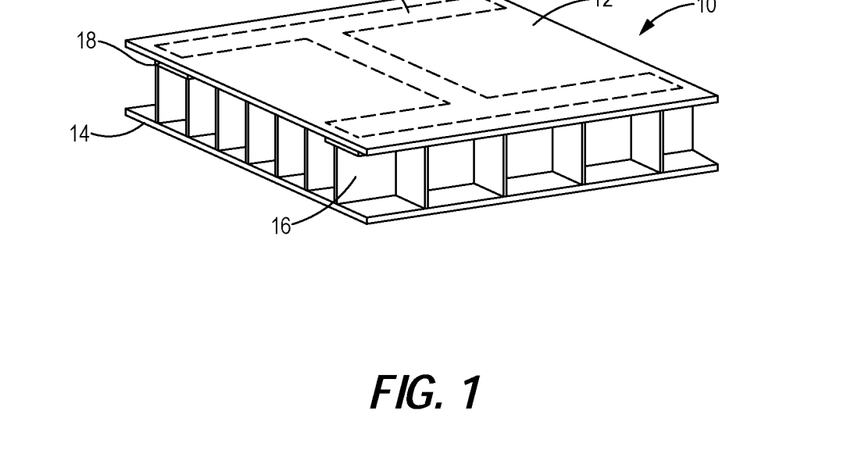
FIG. 1 is a perspective view of one example of an exterior panel for use as an aerodynamically exposed surface of a hypersonic transport vehicle, constructed in accordance with the present disclosure.

FIG. 1 displays an example of an exterior panel 10 that may be useful as a re-usable exterior surface of a hypersonic transport vehicle. The exterior panel 10 includes an exterior skin 12, an interior skin 14, and a multicellular core 16, all of which may be formed of a titanium alloy. Situated between the multicellular core 16 and the exterior skin 12, a skeletal superplastic formable reinforcement (SFR) layer 18 is fixed to the exterior skin 12. The SFR layer 18 may be formed of a dissimilar alloy such as a titanium-zirconium-molybdenum (TZM) alloy. The latter may, by way of example, constitute at least 99% molybdenum, 0.5% titanium, and 0.08% zirconium. In the disclosed example, the SFR layer 18 is designed to provide reinforcement of the exterior skin 12 whenever and if atmospheric friction temperatures of the exterior skin 12 exceed functional limits of titanium, i.e. in the event that temperatures of the exterior skin exceed a predetermined threshold. In a first disclosed example, the SFR layer 18 comprises a rectilinear skeletal structure that underlies at least edges and medial portions of the exterior skin 12 as shown. When exposed to temperatures that exceed 1200° F., the exterior skin 12 may begin to lose strength. As the exposed exterior skin 12 is subject to greatest amounts of heat flux generated by hypersonic travel through an atmosphere, the SFR layer 18, which acts as a spine or skeletal support structure, is configured to reinforce, i.e. support, the exterior skin when temperatures on the exterior skin may exceed material strength limits of titanium. Placement of the SFR layer 18 under the exterior skin 12 is particularly ideal when TZM material is used, since as a metallic alloy TZM may experience significant oxidation if exposed directly to atmosphere.

Although the SFR layer 18 may utilize TZM material as described in the first disclosed example, other materials that exhibit high strength and tensile properties under significant temperatures may be utilized in lieu of the described SFR layer 18 for reinforcement of the exterior skin 12. For example, although heavier, Incoloy 909, which consists of a ferrous-nickel-cobalt alloy having a composition of 42% iron, 38% nickel, 13% cobalt, and 4.7% niobium, may be used instead.

The described TZM and Incoloy materials may be generally referenced herein as superplastic formable reinforcement (SFR) materials because of their respective combinations of high strength, ductility, and tensile properties under high temperatures that exceed the functional capabilities of titanium.

Figure 2:
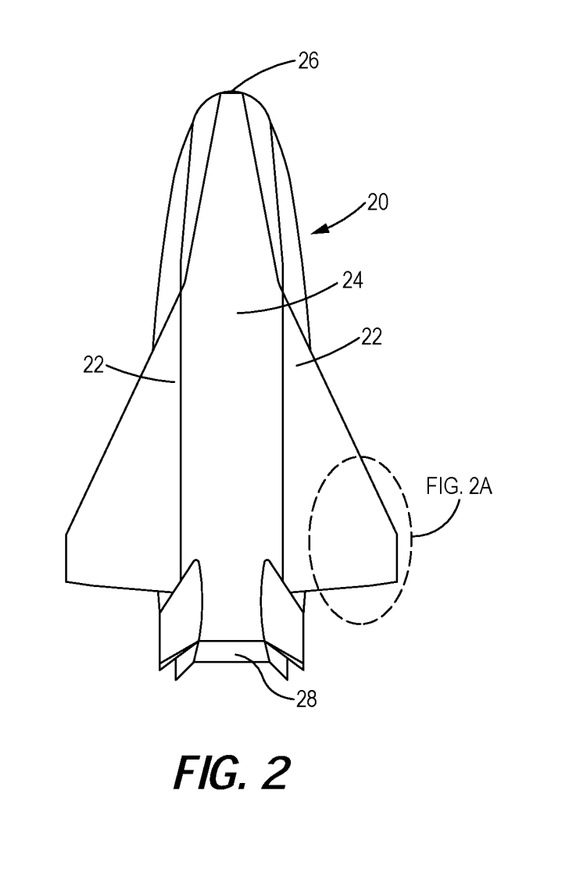
FIG. 2 is a perspective view of a hypersonic transport vehicle of a type that may employ the exterior panel of FIG. 1.
Figure 2A:
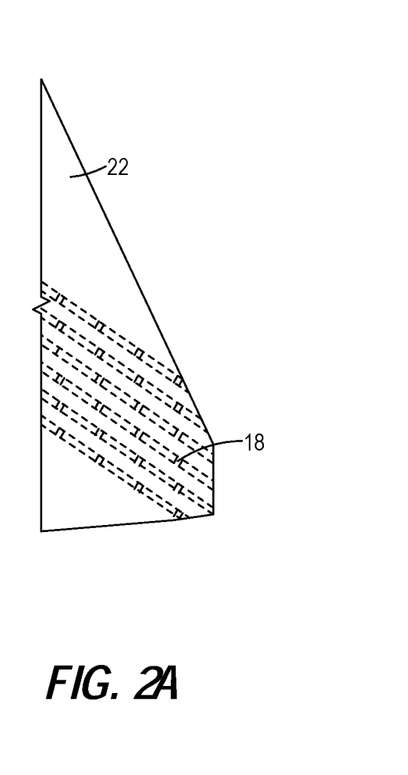
FIG. 2A is an enlarged view of an inset portion of FIG. 2, schematically depicting application of a plurality of exterior panels on the transport vehicle, each exterior panel including a superplastic formable reinforcement (SFR) layer (shown in phantom), configured to support the exterior skin of the exterior panel, in accordance with one example of the present disclosure.

Referring now also to FIG. 2, an exemplary passenger-carrying hypersonic transport vehicle 20 incorporates structural frame members, including a pair of wings 22, that support the transport vehicle 20 in flight. The transport vehicle 20 includes a fuselage 24, a nose 26, and a thrust nozzle 28 of an engine (not shown), for accommodating travel at speeds of Mach 3 to 5 within the stratosphere, i.e. at altitudes of at least 100,000 feet. FIG. 2A displays an inset portion of FIG. 2, depicting one arrangement of a plurality of exterior panels 10 that overlie and comprise at least a portion of the wing 22. In the latter, one exemplary orientation of the otherwise hidden skeletal SFR layers 18 may be as shown in FIG. 2A. The interior skins 14 of the exterior panels 10 in such case may be fusion welded or otherwise secured to the structural frame member, i.e. the wings 22, of the transport vehicle 20. In addition, each of the exterior panels 10 may be fusion welded to one or more adjacent exterior panels 10.

Figure 3:
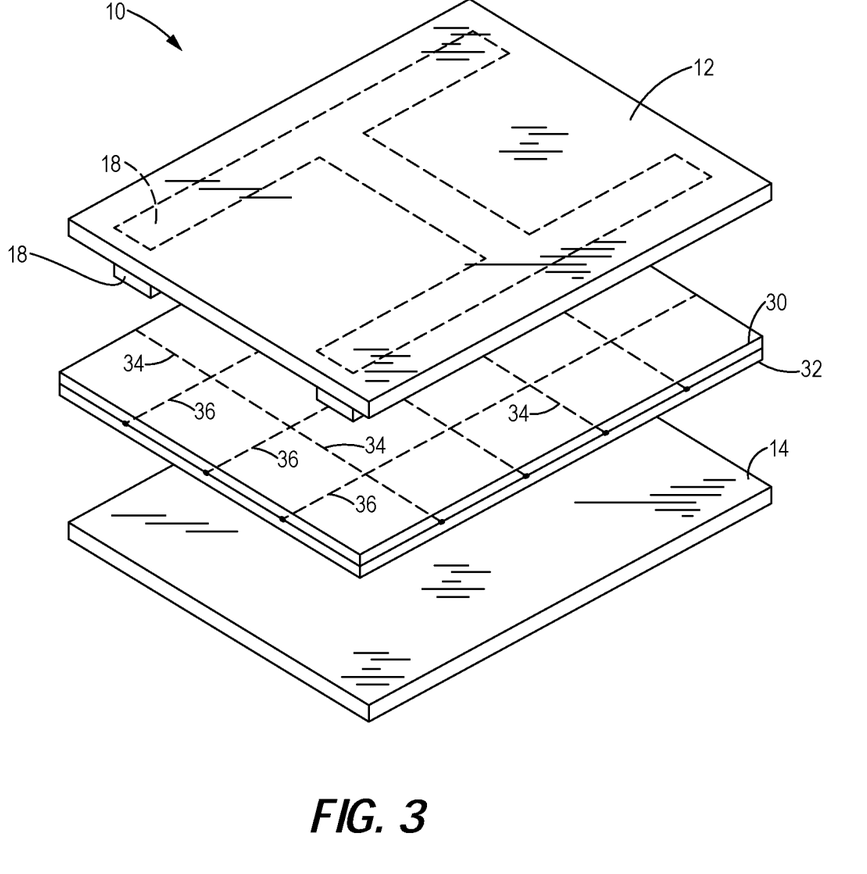
FIG. 3 is an exploded perspective view of components of the exterior panel of FIG. 1, as the components would appear during an initial manufacturing step, including exterior and interior skins with upper and lower core sheets sandwiched between the skins, and depicting the SFR layer underlying and supporting the exterior skin.

FIG. 3 depicts the above-described components of the exterior panel 10, including the exterior skin 12, the SFR layer 18 (for example consisting of one of the above-identified TZM or Incoloy 909 materials), and the interior skin 14, prior to formation of the multicellular core 16. In the disclosed example of FIG. 1, the core 16 of the exterior panel 10 is constructed of a pair of upper and lower core sheets 30, 32 (FIG. 3), consisting of a superplastic material, such as a titanium alloy. Formation of the core 16 occurs during a process of superplastic forming and diffusion bonding (SPF/DB) of the core sheets 30, 32 to the exterior skin 12, the SFR layer 18, and the interior skin 14, within a forming press, as described below, to assure permanent integration of the core 16 with the exterior and interior skins 12, 14. For this purpose, the upper and lower core sheets 30, 32 are initially fusion welded together along first and second arrays 34, 36 of intermittent seam welds. The intermittent seam welds are essentially spot welds, resulting in small vent holes for balancing gas pressure during the SPF/DB manufacturing process. The first and second arrays 34, 36 are orthogonally oriented relative to each other in a predetermined pattern, such that application of gas pressure between the core sheets 30, 32 will create multicellular cores defined by uniformly arranged individual cells, as further detailed below.

Titanium is a material that is both superplastic and suitable for diffusion bonding. Thus, the term "SPF/DB" as applied herein means a manufacturing process in which occurs a solid-state joinder of metallic surfaces under application of heat and pressure for a time duration sufficient to create a co-mingling of atoms at the joint interface of parts being bonded. As such, the SPF/DB process involves a diffusion process during superplastic expansion, but short of causing the joined surfaces to physically melt. In contrast, fusion bonding or welding, as applied herein, refers to metallurgical joining of metallic surfaces by applying sufficient heat to cause the materials at their joint interface to physically melt, i.e. to reach a liquid or plastic state while being joined together.

Figure 4:
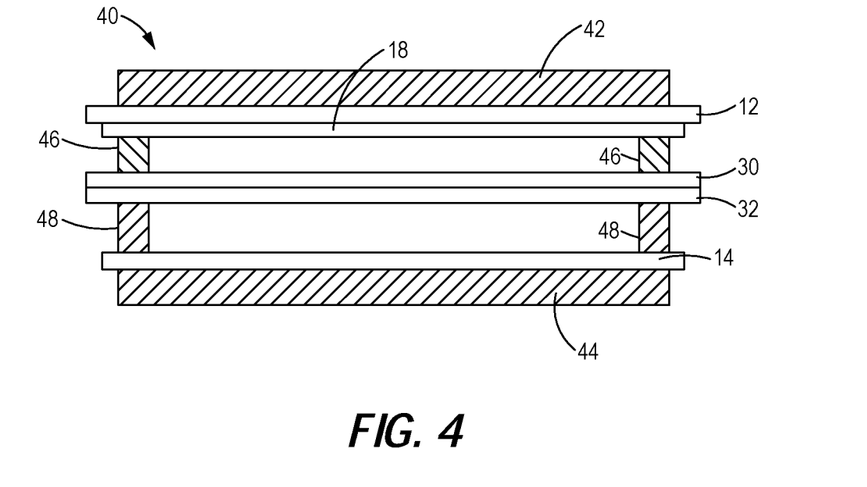
FIG. 4 is a cross-sectional side view of a forming fixture containing the components of FIG. 3, during manufacture of the exterior panel.

Referring now to FIG. 4, a fixture 40 may be used to contain the components of FIG. 3 during manufacture of the exterior panel 10. The fixture 40 is defined by an upper frame member 42 and a lower frame member 44 for supporting the respective exterior and interior skins 12, 14. Upper and lower spacers 46, 48 are used as standoff supports to assure a predetermined desired spacing between the exterior skin 12 as reinforced by the SFR layer 18 and the interior skin 14, while the core sheets 30, 32 are transformed under the high pressure, high temperature SPF/DB manufacturing process into the multicellular core 16 of the exterior panel 10. Although use of standoff supports 46, 48 are shown in the disclosed fixture 40, manufacturing without such standoff supports may also be viable.

Figure 5:
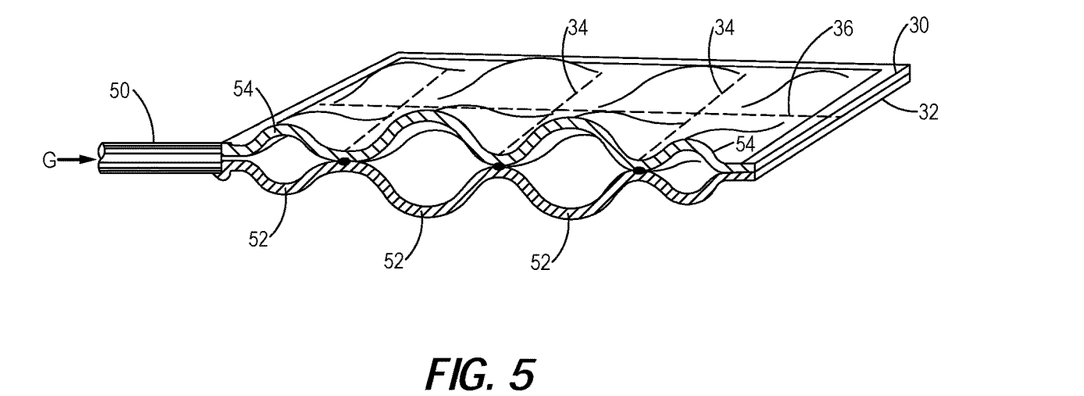
FIG. 5 is a schematic perspective view of how the core sheets may appear during their expansion during manufacture of the exterior panel.
Figure 6:
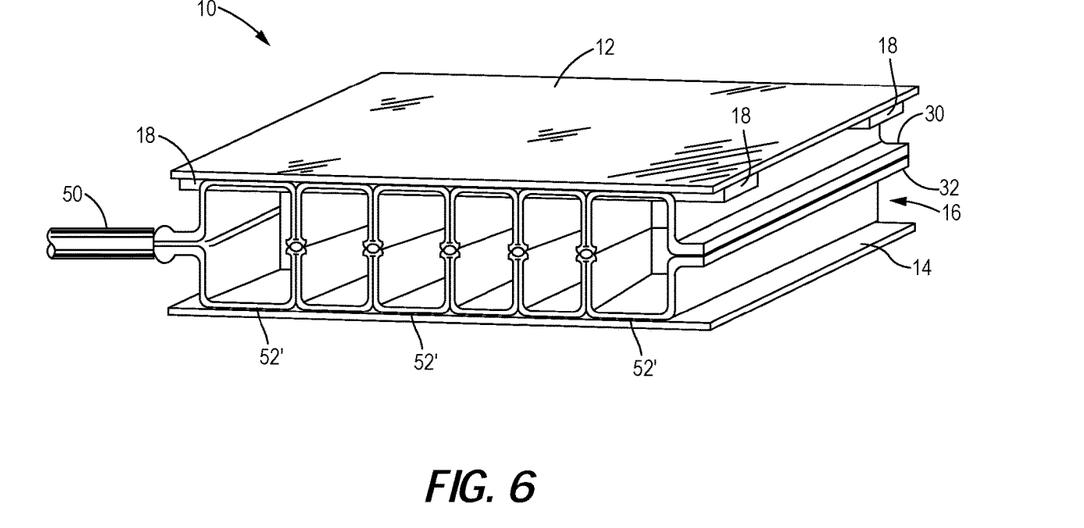
FIG. 6 is a perspective view of an exterior panel including the SFR layer just after manufacture, the view displaying a multicellular core created from upper and lower core sheets that have been fully expanded between the exterior and interior skins.

Referring now to FIG. 5, a perspective cross-section of the upper and lower core sheets 30, 32 shows expansion of the core sheets during manufacture, after an expansion pipe 50 has been secured by fusion welding to one edge. The perimeter edges of the core sheets 30, 32 are bonded together, and an inert gas G is supplied at a high pressure into the expansion pipe 50. Referring now also to FIG. 6, the pressure of the gas G on first and second arrays 34, 36 of intermittent seam welds produces bulged out portions 52 of the lower core sheet 32, and corresponding bulged out portions 54 of the upper core sheet 30, and ultimately transforms the core sheets into fully formed cell structures 52' (FIG. 6) of the multicellular core 16 (FIG. 6). Moreover, it should be appreciated that visible lines of delineation or demarcation between components, i.e. of the exterior skin 12, the SFR layer 18, the interior skin 14, along with the upper and lower core sheets 30, 32, all as schematically displayed in FIG. 6, are only for the purpose of describing how the components fit together after the SPF/DB manufacturing process. Indeed, after such manufacture of the exterior panel 10, any cross-section taken will reveal no visible lines of demarcation, as the components will have then become integrally bonded together into a unified structure.

Continuing reference to FIG. 6, it will be appreciated that individual cells 52' of the core 16 of the superplastic formed and diffusion bonded exterior panel 10 are constrained by the intermittent seam welds of each of the first and second arrays 34, 36, the upper exterior skin 12 with its reinforcing SFR layer 18, as well as the lower interior skin 14. In the described example, the SFR layer may be fusion welded, or at least tack welded, to the exterior skin 12 prior to assembly of components, and prior to admission of the inert gas G.

Figure 7:
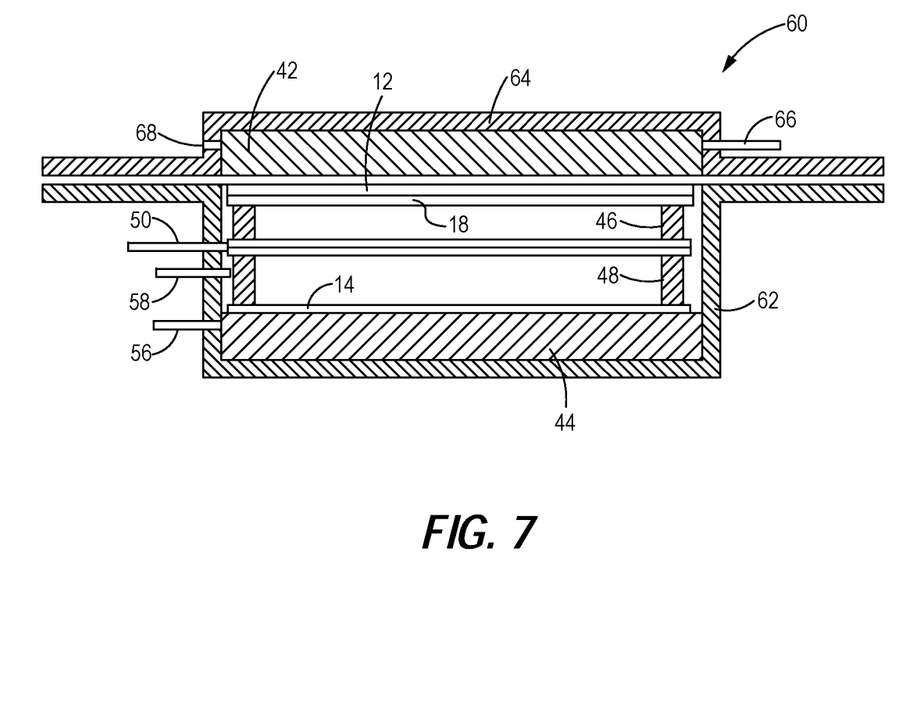
FIG. 7 depicts a forming press for the fixture of FIG. 4, to accommodate a superplastic forming and diffusion bonding process to manufacture the exterior panel of this disclosure.

Referring now also to FIG. 7, a pressure containment device, such as a superplastic forming press 60, includes a lower member, such as a containment box 62, and an upper member, such as a containment box cover 64, configured to be secured to the containment box 62. It will be appreciated that the fixture 40 of FIG. 4, containing above-described individual components of a pre-manufactured exterior panel 10 (FIG. 3), is inserted into the superplastic forming press 60 to manufacture each completed exterior panel 10 via SPF/DB process. For this purpose, an inert gas G, such as argon, may be used to pressure form the exterior panel 10, particularly if such structure is comprised of superplastic formidable materials, such as the described titanium alloy and SFR components. Other inert gases may also be appropriate for the noted components.

Continuing reference to FIG. 7, prior to pressuring the superplastic forming press 60, a purging of atmospheric air from the superplastic forming press 60 is first conducted, using an noncorrosive gas, again for example argon, since atmospheric air can be corrosive at SPF/DB manufacturing temperatures of nearly 1700° F. For this purpose, purging and vacuum tubes such as a vacuum tube 56, a lower purge tube 58, an upper purge tube 66, and a purge vent 68, are all schematically shown as exemplary structures for accommodating a pre-manufacturing purging. After each instance of the SPF/DB manufacture of an exterior panel 10 is completed, the finished exterior panel 10 (e.g., FIG. 1) is removed from the superplastic forming press and trimmed. Thus, FIG. 1 depicts a completed, fully trimmed, exterior panel 10, i.e. having been removed from the superplastic forming press 60 and the fixture 40, and with the expansion pipe 50 removed.

It may be noted that during hypersonic flight steady-state operating temperatures of the exterior skin 12 of an exterior panel 10 made of titanium alloy may range as high as 1100 to 1200° F. The exterior skin 12 may have a thickness ranging from 5 thousandths inch up to approximately 60 thousandths inch, while the SFR layer (18) may range from 80 to 150 percent of the thickness of the exterior skin (12). Moreover, the SFR layer (18) may underlie at least 20 to 80 percent of the exterior skin (12). The thickness of the core sheets 30, 32 may be in the range of 1 mm or 40 thousandths inch, and the interior skin 14 may have a thickness comparable to or somewhat less than that of the exterior skin 12. The pressure of gas G may range between 200-500 psi during the SPF/DB manufacturing process.

Figure 8:
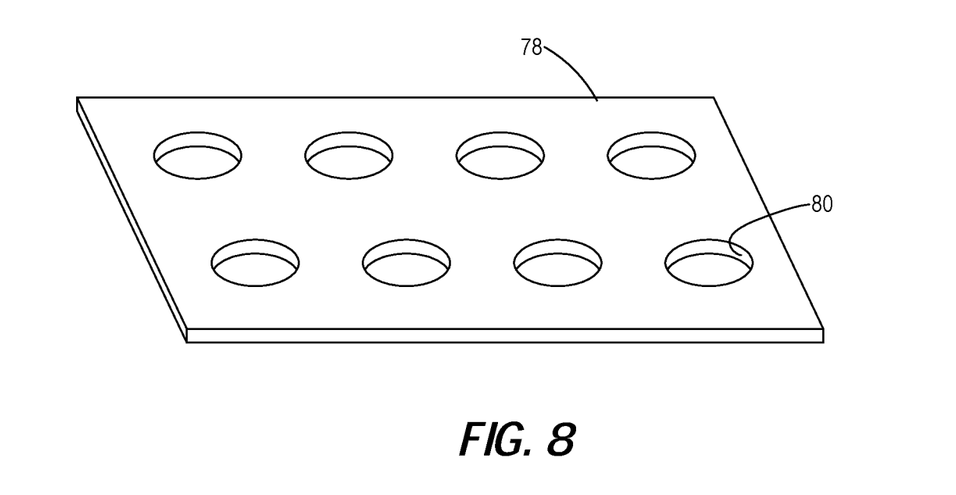
FIG. 8 is a perspective view of another example of an SFR layer having a geometric pattern different from that of the SFR layer of FIG. 1.

Referring now to FIG. 8, an alternate reinforcement SFR layer 78 is shown. The SFR layer 78 is formed using a SPF/DB manufacturing process, similar to the previously described example, i.e. SFR layer 18 of FIG. 1, but may include a plurality of circular apertures 80, shown in FIG. 8 as just one example.

Figure 9:
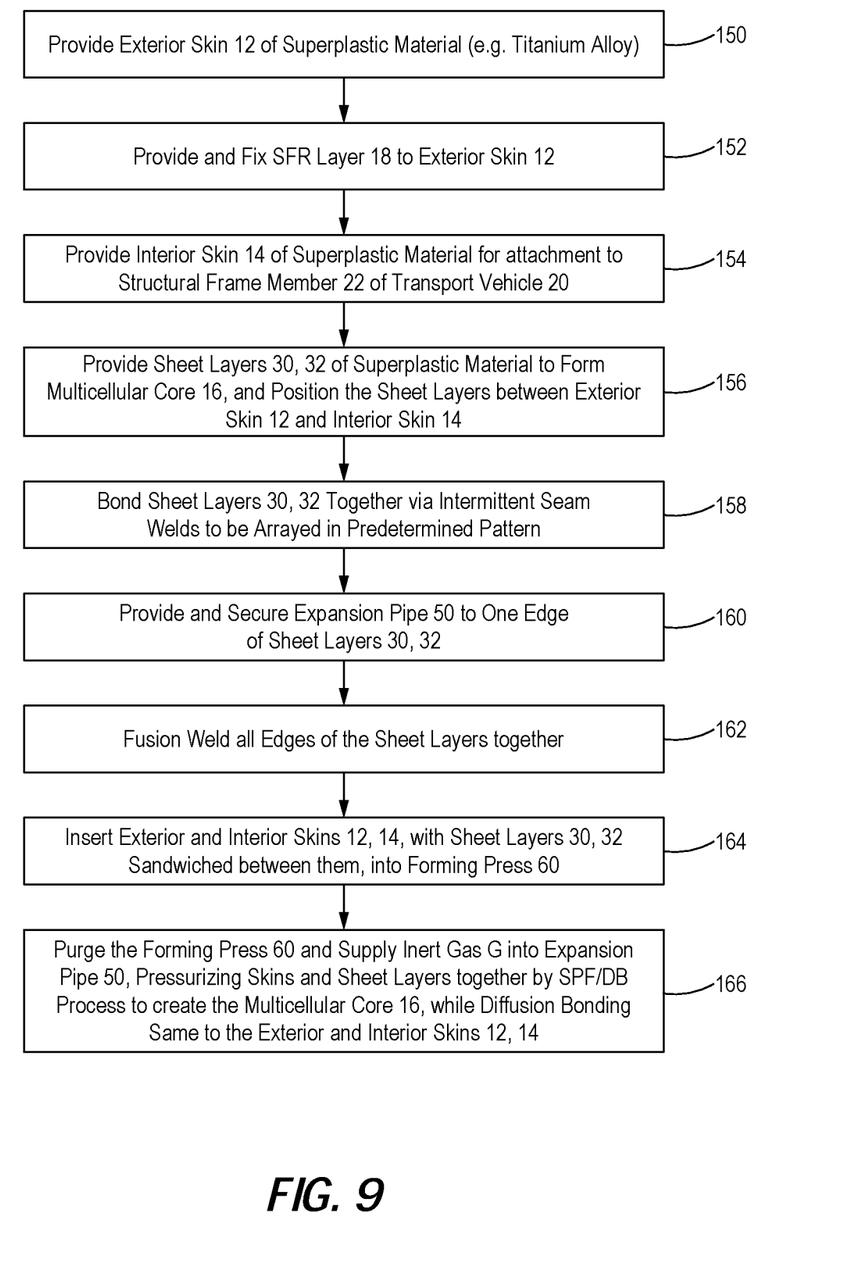
FIG. 9 displays a sequence of method steps for making the exemplary exterior panel of FIG. 1.

Referring now to FIG. 9, a method of making the exemplary exterior panel 10 (of FIG. 1) for a transport vehicle 20 (FIG. 2) includes a step 150 of providing an exterior skin 12 of a superplastic material (e.g. a titanium alloy) configured for atmospheric exposure. The method further provides a step 152 of fixing a SFR layer 18 to the exterior skin 12, and a step 154 of providing an interior skin 14. The latter skin is also of a superplastic material, and is configured for attachment to a structural frame member such as a wing 22 of the transport vehicle 20. The method next includes the step 156 of providing a pair of core sheets 30, 32, also of a superplastic material, for forming a multicellular core 16 between the exterior skin 12 and the interior skin 14. Next, in accordance with step 158, the core sheets 30, 32 are bonded together via intermittent seam welds arrayed in a predetermined pattern, as exemplified by arrays 34 and 36 (FIG. 3).

In accordance with step 160, an expansion pipe 50 is next secured to one edge of the core sheets 30, 32, and in step 162 a continuous weld is then applied about all edges of the layers. In step 164, the exterior and interior skins 12, 14 are inserted along with the core sheets 30, 32 into the fixture 40, which is then placed into a pressure containment device, such as the superplastic forming press 60. In step 166, the superplastic forming press 60 is purged, and an inert gas G is supplied into the expansion pipe 50 to superplastic pressurize the skins and layers to create the multicellular core 16 that becomes integrally bonded to the exterior and interior skins 12, 14.

As noted above, during the SPF/DB process, pressures of 200-500 psi may be reached during the described superplastic formation of the exterior panel 10.

Although only a few examples and method steps have been described herein, this disclosure may admit to yet other variations and modifications neither described nor suggested. For example, although not described above, the exterior panel 10 may have other multicellular core configurations, resulting in significantly lighter, simpler, and less costly structures. For example, the multicellular core may be formed of only a single core sheet layer in some envisioned examples. Moreover, inert gases other than argon may be utilized in the SPF/DB process to manufacture the exterior panels 10. Also, it is envisioned that material compositions other than the described TZM and Incoloy materials may be employed for the disclosed superplastic formable reinforcement (SFR) layers 18 to support the exterior skin 12, to the extent that their high strength and tensile properties remain effective in environments exceeding 1200 degrees Fahrenheit. Finally, several other viable methods not described herein can be envisioned for manufacturing the exterior panel 10, as may be appreciated by those skilled in the art.

Clause 1: An exterior panel for a transport vehicle, the exterior panel comprising an exterior skin configured for atmospheric exposure; an interior skin configured for attachment to a structural frame member of the transport vehicle; a multicellular core sandwiched between the exterior skin and the interior skin; and a superplastic formable reinforcement (SFR) layer underlying and supporting the exterior skin, wherein the multicellular core is superplastic formed and diffusion bonded to the exterior and interior skins.

Clause 2: The exterior panel of Clause 1, wherein all components except the SFR layer are formed of a titanium alloy.

Clause 3: The exterior panel of Clause 1 or 2, wherein the SFR layer is formed of a superplastic formable alloy consisting of titanium, zirconium, and molybdenum (TZM).

Clause 4: The exterior panel of Clauses 1-3, wherein the SFR layer is formed of a superplastic formable alloy consisting of Incoloy 909.

Clause 5: The exterior panel of Clauses 1-4, wherein the SFR layer comprises a skeletal structure underlying 20 to 80% of the exterior skin.

Clause 6: The exterior panel of Clauses 1-5, wherein the SFR layer is configured to reinforce the exterior skin above temperatures in the range of 1200 degrees Fahrenheit.

Clause 7: The exterior panel of Clauses 1-6, wherein the SFR layer is 80 to 150 percent of the thickness of the exterior skin.

Clause 8: A transport vehicle having at least one exterior panel, the at least one exterior panel comprising an exterior skin configured for atmospheric exposure; an interior skin configured for attachment to a structural frame member of the transport vehicle; a multicellular core configured to impart tensile and compressive strength to the exterior panel, the multicellular core being sandwiched between the exterior skin and the interior skin; and an SFR layer that underlies and supports the exterior skin when temperatures on the exterior skin exceed a predetermined threshold temperature; wherein the multicellular core is superplastic formed and diffusion bonded to the exterior and interior skins.

Clause 9: The transport vehicle of Clause 8, wherein the transport vehicle is a hypersonic vehicle having a plurality of exterior panels, and wherein each exterior panel is fusion welded to at least one other exterior panel.

Clause 10: The transport vehicle of Clause 8 or 9, wherein each SFR layer of each of the plurality of exterior panels includes an SFR layer, diffusion bonded to the exterior skin to reinforce the exterior skin above temperatures of 1200 degrees Fahrenheit.

Clause 11: The transport vehicle of Clauses 8-10, wherein the SFR layer is formed of a TZM material.

Clause 12: The transport vehicle of Clauses 8-11, wherein the SFR layer is formed of Incoloy 909.

Clause 13: A method of manufacturing an exterior panel for a transport vehicle, the method comprising providing an exterior skin of a superplastic material configured for atmospheric exposure; providing a SFR layer to be fixed adjacent the exterior skin; providing an interior skin of a superplastic material configured for attachment to a structural frame member of the transport vehicle; providing at least a pair of core sheets of a superplastic material for forming a multicellular core between the exterior skin and the interior skin; then securing the SFR layer to the exterior skin; bonding the pair of core sheets together via intermittent seam welds arrayed in a predetermined pattern, securing an expansion pipe to one edge of the sheets, and then applying a continuous weld about the edges of the sheets; and installing the exterior skin and the interior skin with the core sheets into a pressure containment device, supplying an inert gas into the expansion pipe to superplastic form and diffusion bond the skins and core sheets, creating a multicellular core that is integrally bonded to the exterior and interior skins.

Clause 14: The method of Clause 13, wherein the SFR layer is configured to support the exterior skin when the temperature of the exterior skin exceeds a predetermined threshold.

Clause 15: The method of Clause 13 or 14, wherein the SFR layer is formed of a TZM material.

Clause 16: The method of Clauses 13-15, wherein the SFR layer is formed of Incoloy 909.

Clause 17: The method of Clauses 13-16, wherein the SFR layer is 80 to 150 percent of the thickness of the exterior skin.

Clause 18: The method of Clauses 13-17, wherein the SFR layer underlies 20 to 80 percent of the exterior skin.

Clause 19: The method of Clauses 13-18, wherein the SFR layer comprises a skeletal structure underlying the exterior skin.

Clause 20: The method of Clauses 13-19, wherein the SFR layer supports the exterior skin when the temperature of the exterior skin exceeds 1200 degrees Fahrenheit.

What is claimed is:

1. An exterior panel for transport vehicle, the exterior panel comprising:
    an exterior skin of a superplastic material configured for atmospheric exposure;
    an interior skin of a superplastic material configured for attachment to a structural frame member of the transport vehicle;
    a multicellular core sandwiched between the exterior skin and the interior skin, the multicellular core comprising at least a pair of core sheets of a superplastic material bonded together via intermittent seam welds arrayed in a predetermined patterned; continuously welded about the edges of the core sheets and
    a superplastic formable reinforcement (SFR) layer underlying and secured to the exterior skin, the SFR layer configured to support the exterior skin when an atmospheric friction temperature of the exterior skin exceeds 1200 degrees Fahrenheit,
    wherein the multicellular core is superplastic formed and diffusion bonded to the exterior skin and the interior skin.

2. The exterior panel of claim 1, wherein all components except the SFR layer are formed of a titanium alloy.

3. The exterior panel of claim 1, wherein the SFR layer is formed of a superplastic formable alloy consisting of titanium, zirconium, and molybdenum (TZM).

4. The exterior panel of claim 1, wherein the SFR layer is formed of a ferrous-nickel-cobalt alloy.

5. The exterior panel of claim 1, wherein the SFR layer comprises a skeletal structure underlying 20 to 80% of the exterior skin.

6. The exterior panel of claim 1, wherein the SFR layer is 80 to 150 percent of a thickness of the exterior skin.

7. A transport vehicle having at least one exterior panel, the at least one exterior panel comprising:
    an exterior skin of a superplastic material configured for atmospheric exposure;
    an interior skin of a superplastic material configured for attachment to a structural frame member of the transport vehicle;
    a multicellular core configured to impart tensile and compressive strength to the exterior panel, the multicellular core being sandwiched between the exterior skin and the interior skin, and the multicellular core comprising at least a pair of core sheets of a superplastic material bonded together via intermittent seam welds arrayed in a predetermined pattern; continuously welded about the edges of the core sheets and
    an SFR layer that underlies, is secured to, and supports the exterior skin when an atmospheric temperature on the exterior skin exceeds 1200 degrees Fahrenheit;

wherein the multicellular core is superplastic formed and diffusion bonded to the exterior skin and the interior skin.

8. The transport vehicle of claim 7, wherein the transport vehicle is a hypersonic vehicle having a plurality of exterior panels, and wherein each exterior panel is fusion welded to at least one other exterior panel.

9. The transport vehicle of claim 8, wherein each SFR layer of each of the plurality of exterior panels includes an SFR layer, welded to the exterior skin to reinforce the exterior skin above temperatures of 1200 degrees Fahrenheit.

10. The transport vehicle of claim 7, wherein the SFR layer is formed of a TZM material.

11. The transport vehicle of claim 7, wherein the SFR layer is formed of a ferrous-nickel-cobalt alloy.

12. A method of manufacturing an exterior panel for a transport vehicle, the method comprising:
providing an exterior skin of a superplastic material configured for atmospheric exposure;
providing a SFR layer to be fixed adjacent the exterior skin, the SFR layer configured to support the exterior skin when an atmospheric friction temperature of the exterior skin exceeds 1200 degrees Fahrenheit;
providing an interior skin of a superplastic material configured for attachment to a structural frame member of the transport vehicle;
providing at least a pair of core sheets of a superplastic material for forming a multicellular core between the exterior skin and the interior skin; then
securing the SFR layer to the exterior skin;
bonding the pair of core sheets together via intermittent seam welds arrayed in a predetermined pattern, securing an expansion pipe to one edge of the core sheets, and the applying a continuous weld about the edges of the core sheets; and
installing the exterior skin and the interior skin with the core sheets into a pressure containment device, supplying an inert gas into the expansion pipe to superplastic form and diffusion bond the exterior skin, the interior skin and the core sheets, creating a multicellular core that is integrally bonded to the exterior skin and the interior skin.

13. The method of claim 12, wherein the SFR layer is secured to the exterior skin by welding.

14. The method of claim 12, wherein the SFR layer is formed of a TZM material.

15. The method of claim 12, wherein the SFR layer is formed of a ferrous-nickel-cobalt alloy.

16. The method of claim 12, wherein the SFR layer is 80 to 150 percent of a thickness of the exterior skin.

17. The method of claim 12, wherein the SFR layer underlies 20 to 80 percent of the exterior skin.

18. The method of claim 12, wherein the SFR layer comprises a skeletal structure underlying the exterior skin.

19. The exterior panel of claim 1, wherein the SFR layer is secured to the exterior skin by welding.

20. The method of claim 12, wherein all components except the SFR layer are formed of a titanium alloy.

* * * * *